United States Patent [19]

Hagendoorn

[11] Patent Number: 5,259,867
[45] Date of Patent: Nov. 9, 1993

[54] METHOD OF TREATING DROSS MATERIALS IN METALLURGICAL MELTING PROCESSES

[76] Inventor: Willem J. Hagendoorn, 1219 Constiution Dr., Louisville, Ky. 40214

[21] Appl. No.: 891,186
[22] Filed: Jun. 1, 1992
[51] Int. Cl.$^5$ .............................................. C22B 7/00
[52] U.S. Cl. ................................................. 75/672
[58] Field of Search ....................................... 75/672

[56] References Cited

U.S. PATENT DOCUMENTS

| | | | |
|---|---|---|---|
| 2,987,391 | 6/1961 | Foster et al. | 75/68 |
| 3,070,437 | 12/1962 | Bacheldor | 75/65 |
| 3,320,052 | 5/1967 | Bowden | 75/53 |
| 3,417,166 | 12/1968 | Foster | 263/52 |
| 3,751,243 | 8/1973 | McLeod | 75/672 |
| 3,996,340 | 12/1976 | Steineke | 423/489 |

OTHER PUBLICATIONS

DC Plasma-Arc Process For Melting Aluminum and Process Dross (Sep.) 1991 (17 pages).
Aluminum Dross Processing-Literature Review (14 pages) Recycling of Aluminum Salt Cake (18 pages) 1991.

Primary Examiner—Melvyn J. Andrews

[57] ABSTRACT

In a metallurgical process, a unique materials conservation and environmental process for treating cross materials at the site of a melting chamber by applying a preselected fines suppressing agent to stages of the dross materials promptly after removal from the melting chamber.

10 Claims, 1 Drawing Sheet

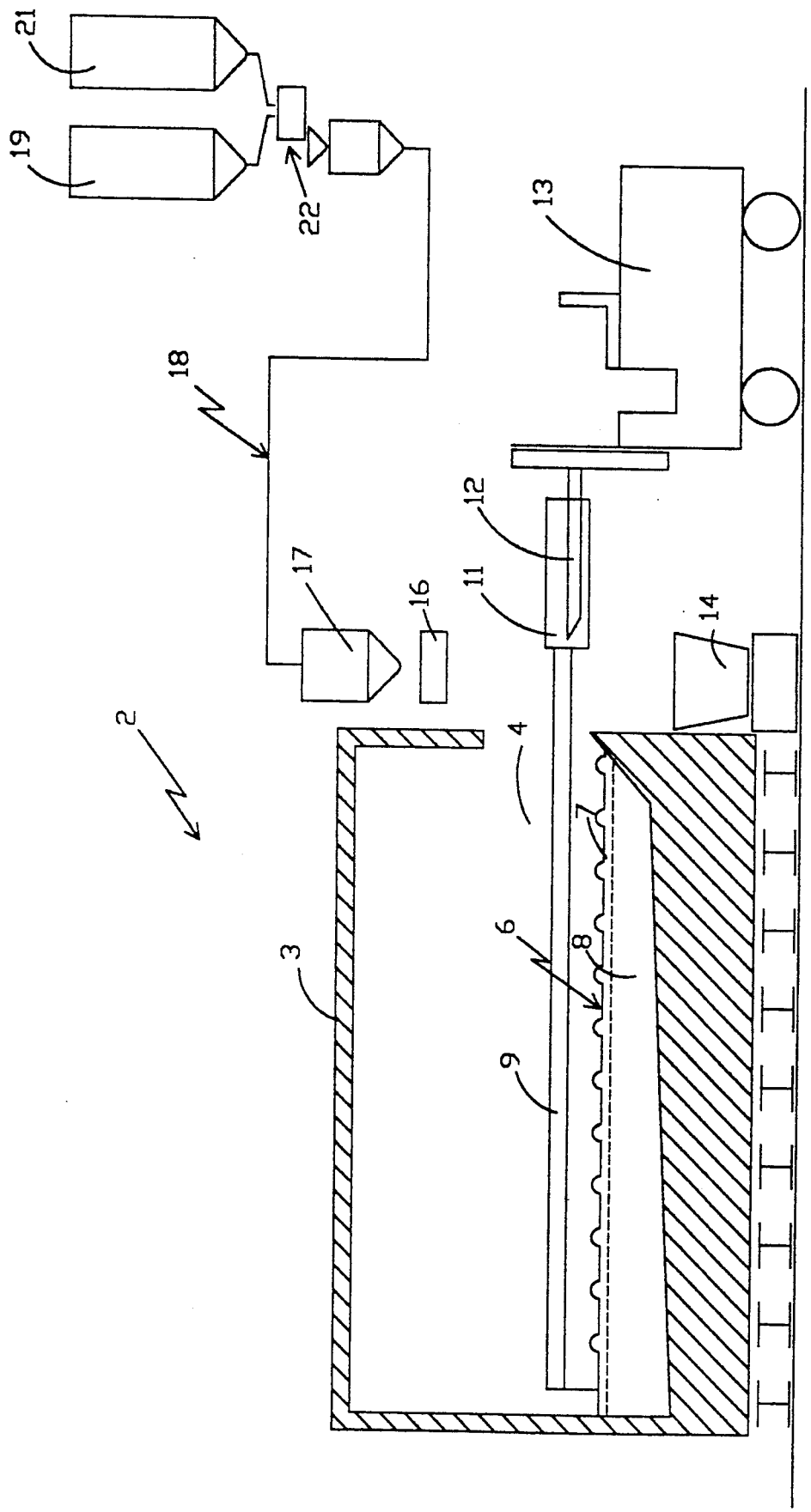

METHOD OF TREATING DROSS MATERIALS IN METALLURGICAL MELTING PROCESSES

BACKGROUND OF THE INVENTION

The present invention relates to metallurgical processes and more particularly to a method of treating dross materials extracted from melting chambers of metallurgical processes, particularly from those melting chambers utilized to melt and remelt aluminum ore and/or aluminum scrap materials to improve homogeneity with alloying elements being added to further improve physical properties.

It long has been known in the metallurgical arts to mix salt with an aluminum metal or dross material and to melt or remelt the same to provide fused aluminum and fused salt which is continuously circulated in the melting process, attention being directed to U.S. Pat. Nos.: No. 2,987,391, issued Jun. 6, 1961 to T. W. F. Foster et al; to No. 3,070,437, issued Dec. 25, 1962 to Robert W. Bacheldor; and to No. 3,417,166, issued on Dec. 17, 1968 to T. W. F. Foster. In this later, Foster Pat. No. 3,417,166 it also is disclosed to provide a salt composition of sodium chloride and potassium chloride in selected proportions by weight to form an eutectic mixture in the melting of aluminum with the density of the mixture being less than the metal to be melted so that the metal may be collected below the molten salt to be protected from the atmosphere.

It also is known to transport dross materials removed from a melting furnace such as in aluminum melting processes to a heated rotary kiln where the dross materials are again mixed with appropriate salts and a certain amount of aluminum in the dross materials is recaptured from the heated rotary kilns.

Further, it generally is known in the metallurgical arts to suppress and utilize waste materials in the form of metallurgical dusts created by metallurgical furnaces by wetting down such dusts entrained in gaseous byproducts with liquids and subsequently treating the wetted dust products for recycling recovery. In this regard, attention is directed to U.S. Pat. No. 3,320,052, issued to J. J. Bowden on May 16, 1967, wherein dust particles entrained in gas formed in an aluminum melting process are wetted down with water and the resulting sludge treated with lime, limestone, iron oxide, mill scale and dolomite to absorb the water, producing a flux utilizable in the steel making process. Attention also is directed to U.S. Pat. No. 3,996,340, issued to F. Steineke on Dec. 7, 1976, wherein silica dust recovered from metallurgical furnace smoke is admixed with fluorspar and treated with steam and aluminum oxide to form aluminum fluoride for use in an aluminum melting process. Such dust suppression with water and steam would be highly undesirable with most dross materials and in many instances could even prove to be calamitous.

The present invention recognizing the need for material and energy conservation in metallurgical melting processes and the further need for environmental control and recovery of certain waste materials resulting from such metallurgical processes provides a unique and novel method for accomplishing the same, the present invention being particularly useful in aluminum melting and remelting operations where dross materials have a course consistency of a porous nature and have a substantial heat. In accordance with the several steps of the present invention, the heat of dross materials recovered from a melting furnace is utilized with a treating agent to substantially reduce process voids and to promptly enhance the function of the treating agent as a dust suppressant which, in turn, enhances pollution control and provides a substantially increased downstream recovery of useful metals with increased metal recoveries of as much as from forty to seventy percent and with a minimal overall amount of undesirable pollutants passed to ambient and to landfill materials. Further, not only are the steps of the present invention economical and straight forward in their execution, requiring a minimum of comparatively economical and unsophisticated equipment in their performance but, in addition, considerable energy is saved both in carrying out the inventive process and in carrying out the downstream metal recovery process which previously required a substantial amount of energy in the form of cooling agents.

Various other features of the present invention will become obvious to one skilled in the art upon reading the disclosure set forth herein.

BRIEF SUMMARY OF THE INVENTION

More particularly the present invention relates to a method in a metallurgical melting process of treating dross materials produced at the site of a melting chamber comprising: removing the dross material from the melting chamber at the melting site in at least one stage during and promptly after completion of the melting process to a preselected area immediately adjacent the melting chamber site; promptly applying a preselected fines suppressing agent at the adjacent preselected area to the surface of the dross materials so removed, the dust suppressing agent being applied in preselected sufficient quantities to substantially cover the exposed surface of the stage of dross materials so removed from the melting chamber to inhibit further oxidation of the dross materials; and, removing the treated suppressed dross materials for further processing. In addition, the present invention allows sufficient residence time in the treating area for the suppressing agent to enter into interacting relation with treated dross materials before further processing—particularly in aluminum melting processes where the suppressing agent enhances the caking of aluminum oxides for fines encapsulation and further facilitates aluminum recovery from the treated dross materials.

It is to be understood that various changes can be made by one skilled in the art in one or more steps of the inventive process disclosed without departing from the scope or spirit of the present invention.

BRIEF DESCRIPTION OF THE DRAWING

The drawing provides a schematic representation of one type of machinery which can be utilized in carrying out the inventive method in accordance with one advantageous embodiment of the present invention.

DETAILED DESCRIPTION OF THE INVENTION

Referring to the drawing which schematically disclosed one type of machinery for carrying out the inventive method, a metallurgical melting site 2 is disclosed as including a melting chamber 3 in the form of a suitable aluminum melting furnace having a dross removal apertured outlet 4 therein along one side and above the aluminum melting bath 6. The dross materials 7 which collect above the surface of the melting aluminum 8, protecting such melting aluminum from further oxidation during melting and acting as an insulation blanket to improve heating operations, are removed in stages through apertured outlet 4 by means of a dross rake 9. Rake 9 is provided with a slotted handle end 11 to receive tongs 12 of moveable fork lift truck 13. The rake 9 and fork lift truck 13 serve to remove the hot dross materials in stages through aperture 4 of melting chamber 3 to fall by gravity in layers into the partially enclosed opened-top tub 14 resting immediately below and adjacent the apertured outlet 4 of the aluminum melting chamber 3, the dross materials being at an approximate temperature of 1450° F. when raked in stages into the opened-top of tub 14. Advantageously, the tub 14 can be sized to receive and hold three or four layers of dross materials successively raked by rake 9 from dross removal aperture 4.

As each layer of dross materials falls into tub 14, a granular salt mixture is applied promptly to the surface thereof in sufficient quantities to cover such surface, such applied quantities amounting to approximately eight (8) to fifteen (15) percent by weight of the total weight of treated dross materials. The salt acts as a shim material between layers and takes on heat from both sides to speed the melting and to enhance penetration and heat conduction. The granular salt mixture is received from a vibrating dispenser screen 16 positioned above opened-top tub 14 and below a receiver 17 connected by a pneumatic transporter assembly 18 to salt storage chambers 19 and 21 which, in turn, are connected to the pneumatic transporter assembly 18 by bottom feeders and mixer assembly 22. Advantageously, the granular salt mixture for treating the dross materials from aluminum melting can be approximately by weight of fifteen to sixty-five percent sodium chloride and eighty-five to thirty-five percent potassium chloride of the total weight of the salt mixture with a minimum amount of a suitable fluxing agent added when considered desirable. The salt mixture reacts endothermically with the dross materials when applied to the surface thereof to absorb some of the heat of the dross materials and to reduce the temperatures from approximately 1450° F. to a suitable range within temperature levels approximating temperatures of 1250° F. where change of phase occurs for aluminum. A sufficient residence time is allowed for the slat mixture to interact with and encapsulate the fines of the covered dross materials to produce aluminum oxide ($Al_2O_3$) cakes int he dross materials before tub 14 is removed by fork lift truck 13 from the melting site 2 for further aluminum recovery processing from the caked dross materials, the inventive method of immediately caking the dross materials serving not only to suppress dross fines from escaping to ambient but also to reduce the energy required in subsequent aluminum removal processing and to increase the amount of aluminum removal by as much as 40 to 70 percent. In addition, the amount of pollutants in the final wastes used for landfill after aluminum recovery processing of the treated dross materials are substantially reduced.

It is to be understood that the present invention is not to be considered as limited tot he particular metallurgical melting processing of aluminum dross materials and equipment as described herein but that such inventive steps can be carried out with other equipment—even by shoveling the dross materials in layers at the adjacent ground site area—and can be applied to the treating of dross materials removed from other types of metallurgical processes. Further, it is to be understood that other fines suppressing agents can be used, such appressing agents being selected so as to be compatible with the chemistry f the dross materials involved.

The invention claimed is:

1. In a metallurgical melting process, a method of treating dross materials at the site of a melting chamber comprising: removing said dross materials from a removal mouth of said melting chamber at said melting site in at least one stage during and promptly after completion of the melting process to a preselected area proximate and immediately adjacent the removal mouth of said melting chamber site; instantaneously applying a preselected interacting fines suppressing agent at said proximate and immediately adjacent preselected area from a fines suppressing vibrating distributing source positioned above said removal mouth to the surface of said dross materials so removed, said dust suppressing agent being applied in preselected sufficient quantities to substantially and instantaneously cover the entirety of the exposed surface of the stage of dross materials so removed from said melting chamber to inhibit further oxidation of said dross materials and to instantaneously suppress oxide dust fines; and, removing said instantaneously treated suppressed dross materials for further processing, allowing sufficient residence time for said suppressing agent to enter into interacting relation with treated and confined dross materials to produce oxide caking before further processing.

2. In the metallurgical melting process of claim 1, said preselected area immediately adjacent said melting chamber site being a partially enclosed chamber of preselected size and configuration.

3. In the metallurgical melting process of claim 1, said dross removal from said melting chamber being accomplished in a plurality of layered stages with the suppressing agent being applied in sufficient quantities to cover the surface of each layered stage.

4. In the metallurgical melting process of claim 1, said preselected fines suppressing agent being chemically selected to instantaneously cover and absorb said oxide dust fines enhancing heat transfer within said covered dross materials.

5. In the metallurgical melting process of claim 1, said dross materials being the product of an aluminum smelting process.

6. In the metallurgical process of claim 1, said dross materials being the product of an aluminum smelting process and said preselected fines suppressing agent being a granular salt to cake said dross materials.

7. In the metallurgical process of claim 6, said granular salt applied to said at least one removed stage of dross materials comprising approximately eight (8) to fifteen (15) percent by weight of the total weight of the treated materials.

8. In the metallurgical process of claim 6, said granular salt being a preselected mixture by weight of the total weight of the mixture of sodium chloride (NaCl) and potassium chloride (KCl).

9. In the metallurgical process of claim 8, said granular salt comprising by weight of approximately fifteen to sixty-five (15–65) percent sodium chloride (NaCl) and eighty-five to thirty-five (85–35) percent potassium chloride (KCl) of the total weight of the mixture of such materials.

10. In a metallurgical aluminum melting process, a method of treating aluminum containing dross materials at the site of an aluminum melting chamber comprising: raking the dross materials in successive stages from the surface of the melting aluminum in the melting chamber into a partially enclosed open ended tub resting immediately adjacent the outlet of said aluminum melting chamber with the dross materials of each stage being at an approximate temperature of 1450° F. when so raked into said tub; instantaneously applying to the surface of each stage of dross materials raked into said tub from a fines suppressing vibrating distributing source positioned proximate and immediately above said open ended tub a granular interacting salt mixture mixed and pneumatically fed to said vibrating distributing source and amounting to approximately eight (8) to fifteen (15) percent by weight of the total weight of the raked stages and being sufficient to substantially instantaneously cover the entirety of the surface of such stage, said granular salt comprising approximately by weight of fifteen to sixty-five percent sodium chloride and eighty-five to thirty-five percent potassium chloride of the total weight of the mixture; and allowing sufficient residence time for the salt mixture to interact with said confined fines to produce aluminum oxide cakes int he dross materials before removing said tub from the melting site for further aluminum recovery processing from the caked dross materials.

* * * * *

UNITED STATES PATENT AND TRADEMARK OFFICE
CERTIFICATE OF CORRECTION

PATENT NO. : 5,259,867
DATED : November 9, 1993
INVENTOR(S) : Willem J. Hagendoorn It is certified that error appears in the above-identified patent and that said Letters Patent is hereby corrected as shown below:

In column 3, line 47, correct "slat" to read --- salt ---;

In column 3, line 50, correct "int he" to read --- in the ---;

In column 4, line 5, correct "f" to read --- of ---.

In column 4, line 3, correct "appressing" to read --- suppressing---.

Title page,
In the ABSTRACT, correct line 2 "cross" to read "dross".

Signed and Sealed this

Twenty-sixth Day of April, 1994

*Attest:*

BRUCE LEHMAN

*Attesting Officer*     *Commissioner of Patents and Trademarks*